US008195873B2

(12) United States Patent
Gazit (10) Patent No.: US 8,195,873 B2
(45) Date of Patent: Jun. 5, 2012

(54) TERNARY CONTENT-ADDRESSABLE MEMORY

(76) Inventor: Hillel Gazit, Palo Alto, CA (US)

( * ) Notice: Subject to any disclaimer, the term of this patent is extended or adjusted under 35 U.S.C. 154(b) by 718 days.

(21) Appl. No.: 12/322,794

(22) Filed: Feb. 6, 2009

(65) Prior Publication Data

US 2010/0205364 A1 Aug. 12, 2010

(51) Int. Cl.
*G06F 12/00* (2006.01)
*G11C 15/00* (2006.01)
(52) U.S. Cl. ..................... 711/108; 365/49.17
(58) Field of Classification Search ................... 711/108
See application file for complete search history.

(56) References Cited

U.S. PATENT DOCUMENTS

| | | | |
|---|---|---|---|
| 6,154,384 A | 11/2000 | Nataraj et al. | |
| 6,362,992 B1 | 3/2002 | Cheng | |
| 6,584,003 B1 | 6/2003 | Kim et al. | |
| 6,735,670 B1 | 5/2004 | Bronstein et al. | |
| 6,791,855 B2 | 9/2004 | Batson et al. | |
| 6,823,434 B1 | 11/2004 | Hannum et al. | |
| 6,889,225 B2 | 5/2005 | Cheng et al. | |
| 6,996,662 B2 | 2/2006 | Miller et al. | |
| 7,228,378 B1 * | 6/2007 | Pereira | 711/108 |
| 7,382,637 B1 * | 6/2008 | Rathnavelu et al. | 365/49.17 |
| 7,392,349 B1 * | 6/2008 | Mathur et al. | 711/141 |
| 2003/0093613 A1 * | 5/2003 | Sherman | 711/104 |
| 2006/0080498 A1 * | 4/2006 | Shoham et al. | 711/108 |
| 2006/0155915 A1 * | 7/2006 | Pereira | 711/100 |
| 2007/0168600 A1 * | 7/2007 | Anthony et al. | 711/108 |
| 2008/0065821 A1 * | 3/2008 | Robotham | 711/108 |
| 2008/0215953 A1 | 9/2008 | Deierling et al. | |

OTHER PUBLICATIONS

Banit Agrawal et al. Modeling TCAM Power for Next Generation Network Devices. IEEE International Symposium on Performance Analysis of Systems and Software(ISPASS). 2006. pp. 1-10.
Samar Sharma et al. Sorting and Searching using Ternary CAMs. IEEE 10th Symposium on High Performance Interconnects Hot Interconnects. 2002.
Anthony J. McAuley et al. Fast Routing Table Lookup Using CAMs. IEEE 1993. pp. 1382-1391.
Kostas Pagiamtzis et al. Content-Addressable Memory (CAM) Circuits and Architectures: A Tutorial and Survey. IEEE Journal of Solid-State Circuits, vol. 41, No. 3, Mar. 2006. pp. 712-727.
Kostas Pagiamtzis et al. A Low-Power Content-Addressable Memory (CAM) Using Pipelined Hierarchical Search Scheme. IEEE Journal of Solid-State Circuits, vol. 39, No. 9. Sep. 2004. pp. 1512-1519.

(Continued)

*Primary Examiner* — Jared Rutz
*Assistant Examiner* — Aracelis Ruiz
(74) *Attorney, Agent, or Firm* — Douglas L. Weller (57) ABSTRACT

A low-heat, large-scale ternary content-addressable memory (TCAM) efficiently compares one or more input records with a set of entries. Compression may also be used. X bits are eliminated from entries and in some embodiments, a subset of non-X bits are also eliminated, minimizing entries that must be searched. Entry bit sets can be converted into sets of fields. A useful set of fields is a triplet comprising a start field, a length field, and a data field. Hashing determines the RAM line of the TCAM in which entries are stored and which RAM line is to be compared with a given input. Searches are only needed on entries in RAM lines corresponding to inputs of interest. Priority values decide the winner if more than one TCAM entry in the appropriate RAM line matches the input. Bin packing can be used to optimally allocate TCAM entries across different possible RAM lines.

23 Claims, 6 Drawing Sheets

OTHER PUBLICATIONS

Igor Arsovski et al. A Mismatch-Dependent Power Allocation Technique for Match-Line Sensing in Content-Addressable Memories. IEEE Journal of Solid-State Circuits, vol. 38, No. 11. Nov. 2003. pp. 1958-1966.

Hideyuki Noda et al. A Cost-Efficient High-Performance Dynamic TCAM With Pipelined Hierarchical Searching and Shift Redundancy Architecture. IEEE Journal of Solid-State Circuits, vol. 40, No. 1. Jan. 2005. pp. 245-253.

Valerie Lines et al. 66MHz 2.3M Ternary Dynamic Content Addressable Memory. IEEE Xplore. 2000. pp. 101-105.

Rina Panigrahy et al. Reducing TCAM Power Consumption and Increasing Throughput. IEEE. 10th Symposium on High Performance Interconnects Hot Interconnects. 2002.

Jon P. Wade et al. A Ternary Content Addressable Search Engine. IEEE Journal of Solid-State Circuits, vol. 24, No. 4. Aug. 1989. pp. 1003-1013.

Rina Panigrahy et al. Sorting and Searching Using Ternary CAMs. IEEE Computer Society. Jan.-Feb. 2003. pp. 44-53.

Nitin Mohan. Low-Power High-Performance Ternary Content Addressable Memory Circuits. A Thesis presented to the University of Waterloo, Ontario, Canada. 2006.

Igor Arsovski et al. A Ternary Content-Addressable Memory (TCAM) Based on 4T Static Storage and Including a Current-Race Sensing Scheme. IEEE Journal of Solid-State Circuits, vol. 38. No. 1. Jan. 2003. pp. 155-158.

David E. Taylor et al. On using addressable memory for packet classification. Department of Computer Science & Engineering-Washington University in St. Louis. WUCSE-2005-9. Mar. 3, 2005.

Devavrat Shah et al. Fast Updating Algorithms for TCAMs. IEEE Micro. Jan.-Feb. 2001. pp. 36-47.

\* cited by examiner

TERNARY CONTENT-ADDRESSABLE MEMORY

BACKGROUND OF THE INVENTION

A. Field of the Invention

The present invention generally relates to ternary content-addressable memory. More particularly, the present invention relates to a low-heat, large-scale ternary content-addressable memory using hash. Compression may also be used to further enhance results but is not required.

B. Description of the Related Art

The ability to search records according to data and not address is a well-known problem in databases. Content-addressable memory (CAM), which may also be known as associative memory or associative storage, is a type of memory used for high-speed computer searches. CAMs typically comprise one or more arrays; each array comprises a large number of entries. Each entry, in turn, comprises information to be used in a search or comparison involving one or more input records. One or more input record entries can be compared in parallel.

Information stored in a CAM may be retrieved on the basis of the content rather than the address. A CAM performs comparison (i.e., exclusive-OR or equivalent) operations at the bit level; CAMs fundamentally constitute an array of linked exclusive-OR gates. The results of comparing a group of bits in words or entries in the CAM storage are transmitted to a processing unit as a CAM can be viewed as comprising a number of bit-serial processing elements.

Binary content-addressable memory employs search terms composed entirely of 1s and 0s. Ternary content-addressable memory (TCAM) employs search terms comprising is, 0s, and a third state of "X" or a so-called "Don't Care" bit. The "X" or "Don't Care" bit is a bit whose value is of no relevance to the search being conducted. The X bit is thus determined based on the search interests of the user. TCAMs are used in a number of applications including network routing tables, database engines, data compression, neural networks, intrusion prevention systems, central processing unit (CPU) cache controllers, and translation look-aside buffers.

TCAMs to date have suffered from large use of resources. X bits are typically not eliminated from the searched entries and a TCAM controller searches all TCAM entries or a substantial portion of the TCAM entries. Silicon usage is large due to suboptimal processing of records and entries to remove as much data as possible that is not essential to the search process. Excessive generation of heat has also limited the compactness and speed available.

SUMMARY OF THE CLAIMED INVENTION

A method for generating an output reporting a success or failure in comparing an input with a set of entries in a ternary content-addressable memory (TCAM) comprising the steps of removing X bits from the set of entries to create one or more retained entry bit sets; storing the one or more retained entry bit sets into the TCAM; selecting, in response to instructions executed by a central processing unit, a set of retained input bits and one or more corresponding sets of retained entry bits; determining, by a digital comparator, whether a match exists between the retained input bit set and the corresponding retained entry bit set, a match indicating success and no match indicating a failure; and generating, by the digital comparator, output reporting the comparison as success or failure.

A method for generating an output reporting a success or failure in comparing an input with a set of entries in a TCAM, comprising the steps of removing X bits from the set of entries to create one or more retained entry bit sets; compressing, in response to instructions executed by a central processing unit, the one or more retained entry bit sets to create one or more sets of fields including retained entry bits; storing the sets of fields into a TCAM; selecting, in response to instructions executed by the central processing unit, sets of retained input bits with positions that correspond to the sets of fields; comparing, by a digital comparator linked to a field processor in an ordered series of one or more field processors, sets of retained input bits with corresponding set of fields; determining, by the digital comparator, whether a match exists between one or more sets of retained input bits and the corresponding sets of fields, the existence of a match indicating a success and the lack of a match indicating a failure; reporting the successes and failures to a TCAM controller by the one or more field processors; collating, by the TCAM controller, all field processors reporting success when no more retained input bits remain to be compared; applying, by the TCAM controller, a predetermined priority determination protocol to all field processors reporting success to determine a priority for the successful field processors; and generating, by the TCAM controller, an output reporting as the winner the success-reporting field processor that has the highest priority according to the priority determination method.

A method for generating an output reporting a success or failure in comparing an input with a set of entries in a TCAM, comprising the steps of removing X bits from the set of entries to create one or more retained entry bit sets; compressing, in response to instructions executed by a central processing unit, the one or more retained entry bit sets to create one or more sets of triplets; storing the sets of triplets into a TCAM; selecting, in response to instructions executed by the central processing unit, sets of retained input bits with positions that correspond to the sets of triplets; comparing, by a digital comparator linked to a field processor in an ordered series of one or more field processors, sets of retained input bits with corresponding sets of triplets; determining, by the digital comparator, whether a match exists between one or more sets of retained input bits and the corresponding sets of triplets, the existence of a match indicating a success and the lack of a match indicating a failure; reporting the successes and failures to a TCAM controller by the one or more field processors; collating, by the TCAM controller, all field processors reporting success when no more retained input bits remain to be compared; determining, by the TCAM controller, using the predetermined priority determination protocol, priorities for the successful field processors; compressing, by the TCAM controller, one or more of the determined priorities; finding, in response to instructions executed by the central processing unit, a successful field processor that has the highest priority of the successful field processors; and generating, by the TCAM controller, an output reporting the highest-priority successful field processor to be the winner.

A method for generating an output reporting a success or failure in comparing an input with a set of entries in a TCAM comprising storage lines having a storage limit, comprising the following steps: removing X bits from the set of entries to create one or more retained entries; using one or more hash functions, converting the retained entries into hashed entries comprising hashed entry bit sets, so that the largest number of hashed entry bits is less than or equal to the storage limit; determining a number of hashed entry values for each hashed entry bit set; using a bin-packing algorithm, allocating an optimized number of storage lines to store the one or more hashed entries into the TCAM; storing the one or more hashed entries into the TCAM; selecting, in response to instructions executed by a central processing unit, a set of retained input bits and one or more corresponding sets of hashed entry bits; determining, by a digital comparator, whether a match exists between the retained input bit set and the corresponding hashed entry bit set, a match indicating success and no match indicating a failure; and generating, by the digital comparator, output reporting the comparison as success or failure.

A computer-readable storage medium having embodied thereon a program, the program being executable by a computer to perform a method for efficiently comparing an input with a set of entries in a TCAM, the method comprising the steps of removing X bits from the set of entries to create one or more retained entry bit sets; storing the one or more retained entry bit sets into the TCAM; selecting a set of retained input bits and one or more corresponding sets of retained entry bits; determining whether a match exists between the retained input bit set and the corresponding retained entry bit set, a match indicating success and a lack of a match indicating failure; and generating output reporting the comparison as success or failure.

DETAILED DESCRIPTION

Embodiments of the invention offer a system and method whereby X bits do not have to be checked and therefore do not have to be remembered. The number of entries that must be checked in a search is thereby greatly reduced. X bits are selected based on a user's search criteria as bits not relevant to the search criteria of the user. X bits are eliminated by a central processing unit. In certain embodiments, only a subset of the non-X entry bits is retained and used with the central processing unit eliminating the non-retained entry bits. Searches only need to be performed on TCAM entries in the RAM line or RAM lines corresponding to an input or inputs of interest. Optional compression steps reduces the number of bits that must be checked per entry. Memory requirements are reduced based on a lack of need to retain X bits and, in some embodiments, a lack of need to retain all non-X bits.

Embodiments of the invention may allow for increased computational speed relative to existing systems. RAM is optimized by eliminating X bits, by optionally compressing entries, and by hashing both entries and inputs so that not much heat is generated. Because of the X bit, conventional TCAM uses a theoretical minimum of 1.5 RAM bits per entry bit, which in practice typically amounts to two RAM bits.

An optional compression operation applies a static function to the entry data to compress the number of compressed entry bits. The optional compression process of selecting compressed entry bits streamlines data processing and reduces required memory. The optional data compression process is followed by a hash operation on the compressed entry bits. The entry bits are then saved in a ternary content-addressable memory (TCAM). Entries that produce the same output from the hashing function or hash table will be saved in the same RAM line.

Near-optimal hashing uses bin packing principles to allocate the TCAM entries across the different possible RAM lines so that each RAM line contains approximately the same number of entries, with no RAM line containing more entries than its capacity permits. This approach saves greatly on memory space and heat while not causing substantial losses in accuracy or speed of results.

Figure 1A:
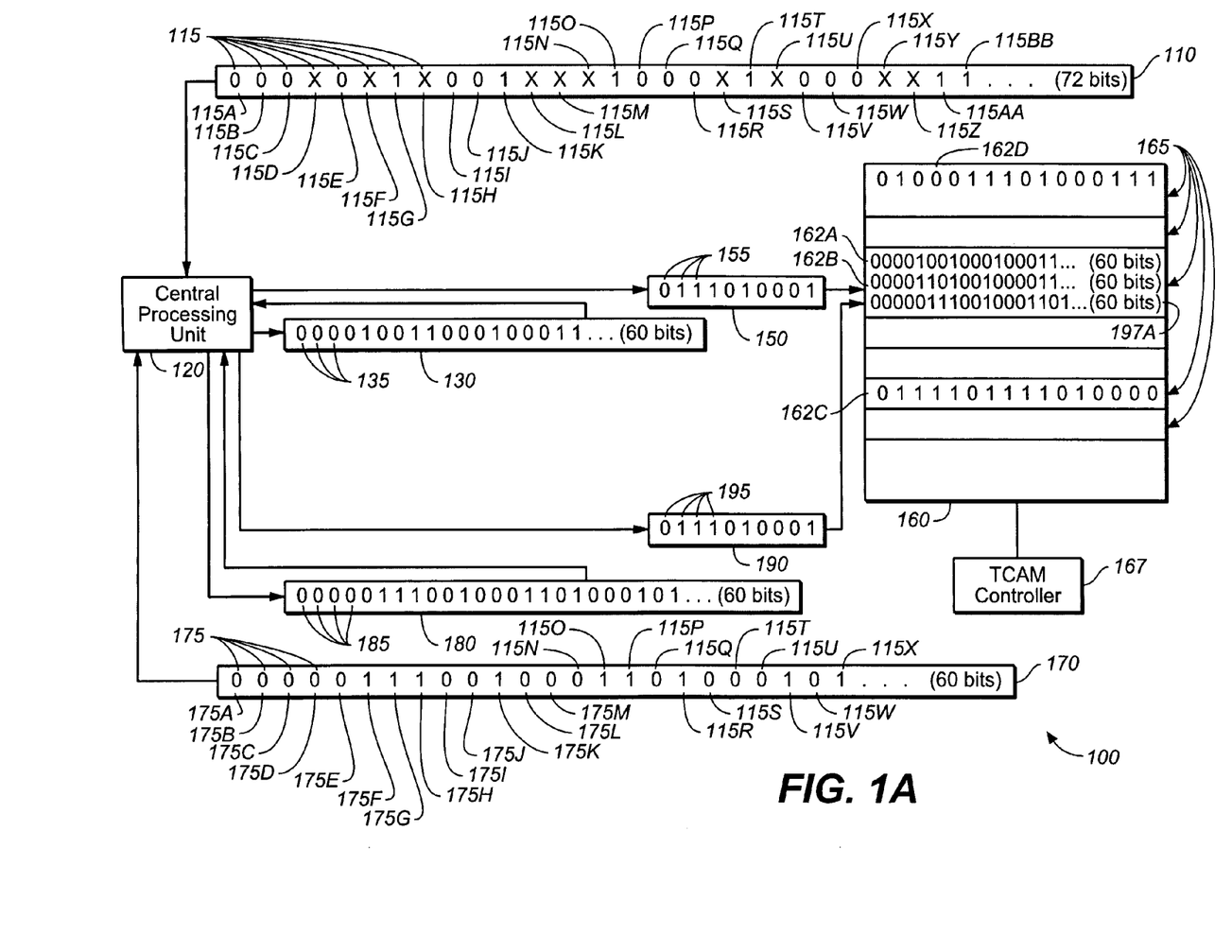
FIG. 1A illustrates processing and storing an entry and an input pursuant to a TCAM using hash without compression.

FIG. 1A illustrates processing and storing an entry pursuant to a TCAM using hash without compression. The entries are entered, hashed, and then stored as TCAM entries in the RAM line of TCAM storage corresponding to the matching hash key.

Entry 110, which includes entry bits 115, is entered into central processing unit 120. In this example, entry 110 includes 72 entry bits 115. Central processing unit 120 removes X bits from entry 110, retaining a number N of non-X bits as retained entry 130 comprising retained entry bits 135.

Retained entry 130 includes a more manageable number N of retained entry bits 135 versus the larger number of bits from entry 110. In this example, N=60. N can be preset by a user or otherwise predetermined. N can also be selected during operation according to a preset algorithm. 60 bits of the 72 entry bits 115 in entry 110 are retained as retained entry bits 135 in retained entry 130.

None of the retained entry bits 135 is an X bit. In this example, the first ten retained entry bits 135 are the entry bits 115A-115C, 115I-115K, and 115O-115R. Entry bits 115D, 115F, 115H, and 115L-115N are X bits so they are omitted from retained entry 130. Entry bits 115E and 115G, while not X bits, are among the entry bits not retained in retained entry 130. This example is chosen purely for illustrative purposes; more complex retention algorithms may be used.

Retained entry 130 next enters into central processing unit 120. Using one or more of a hash table, a set of one or more hashing functions, and direct hashing bits, central processing unit 120 generates a hash key 150 that fits the retained entry bits 135 in retained entry 130. In this example, the 16 retained entry bits 135 are transformed into hash key 150 including 10 entry hash key bits 155. Since entry hash key bits 155 are generated from retained entry bits 135, which are not X bits, entry hash key bits 155 are also not X bits.

Central processing unit 120 directs the retained entry 130 matching hash key 150 to TCAM storage 160. Retained entries 130 are saved as TCAM entries 162A, 162B, 162C, 162D . . . in one of the RAM lines 165 in TCAM storage 160. Each RAM line 165 matches one hash key 150.

TCAM entries are also known as word lines. TCAM storage 160 comprises an array of RAM lines 165. RAM lines 165 can hold any number of TCAM entries 162 comprising retained entry bits 135. TCAM entry 162A comprises the same bits as retained entry 130. Another TCAM entry 162B fit the same hash key and therefore is stored in the same RAM line 165. TCAM entries 162C and 162D are stored in other RAM lines 165. TCAM controller 167 conducts searches of TCAM storage 160.

Each of the entry hash key bits 155 comprising hash key 150 will not be an X bit. In this example, hash key 150 comprises 10 entry hash key bits 155, none of which is an X bit. Operation of embodiments of the invention produces an array of TCAM entries 162 that are entered into a total of $2^{10}=1024$ RAM lines 165.

A hash function transforms a set of retained entry bits into an index of a line in the RAM. The hash functions make no use of X bits. The TCAM controller 167 selects one or more hash functions that will distribute the entries in an approximately pseudo-random fashion so that each line of RAM will have approximately the same number of entries. Approximately the same number of zeroes and ones will be generated with X bits minimized. Alternatively, or in addition, one or more hash tables can be used.

If hash functions are employed, a small number of hash functions (around eight) may be sufficient to adequately disperse the entries into different hash keys while not unduly slowing the speed of the process. Implementation of each of the hash functions can be relatively expensive without influencing too much the total size or cost of the system.

A RAM line 165 can hold any number of retained entries 130. TCAM storage 160 thus stores an array of retained entries 130 with each TCAM entry 162 matching entry hash key bits 155 with each entry hash key bit 155 having a corresponding position and also a corresponding value.

Next, an input is entered. Retained input bits are determined and the input is hashed and then stored as a TCAM input in the RAM line of TCAM storage corresponding to the matching hash key. Due to X bits, more than one hash key may be generated for a given input, and therefore there may be more than one matching hash key. In that event, a TCAM input will be stored in the RAM lines corresponding to the matching hash keys.

Input record 170, comprising input bits 175A-175X..., is entered into central processing unit 120. Input record 170 comprises, in this example, 60 input bits 175. Input record 170 passes through central processing unit 120. Central processing unit 120 selects a set of input bits 185 that corresponds in position to the retained entry bits 135. In this example, the number of retained entry bits 135, N=60. Thus, all 60 of the input bits 175 in input record 170 are retained as retained input 180 comprising retained input bits 185. The retained input bits 185 each have a corresponding position and a corresponding value.

Retained input 180 next enters into central processing unit 120. Using one or more of a hash table, a set of one or more hashing functions, or direct hashing bits, central processing unit 120 generates an input hash key 190 that fits the retained input bits 185 in retained input 180. In this example, input hash key 190 comprises 10 input hash key bits 195 and is the same as entry hash key 150.

Central processing unit 120 directs the retained input 180 matching input hash key 190 to TCAM storage 160. Retained input 180 is saved as TCAM input 197A in a RAM line 165 in TCAM storage 160 that matches input hash key 190. TCAM input 197A comprises the same bits as retained input 180.

Figure 1B:
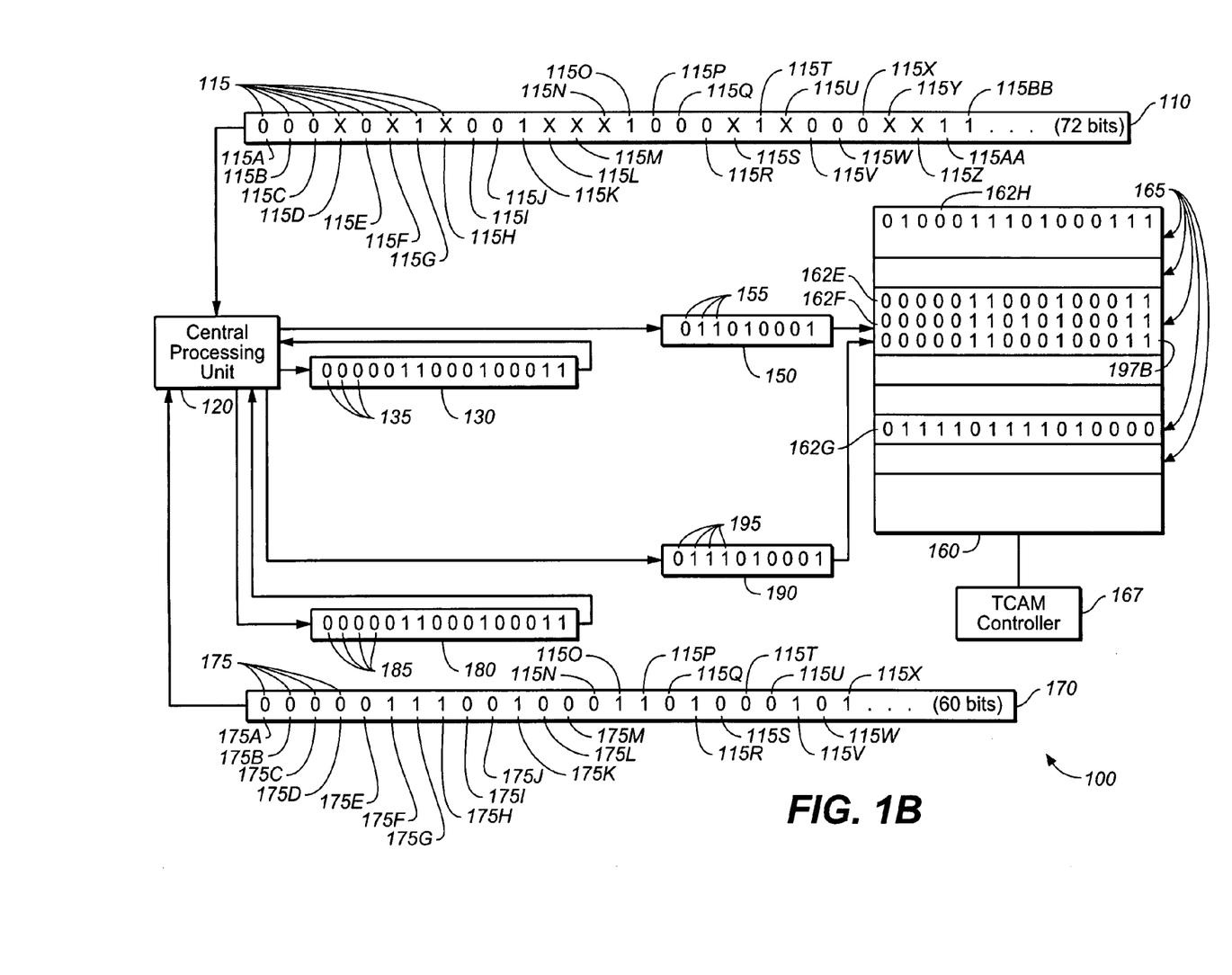
FIG. 1B illustrates processing and storing an entry and an input pursuant to a TCAM using compression and hash.
Figure 1C:
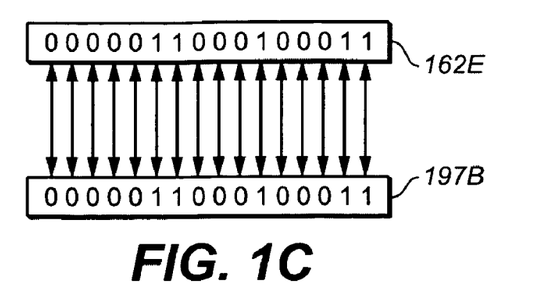
FIG. 1C illustrates comparing an input line against a matching TCAM entry line pursuant to a TCAM using compression and hash.
Figure 1D:
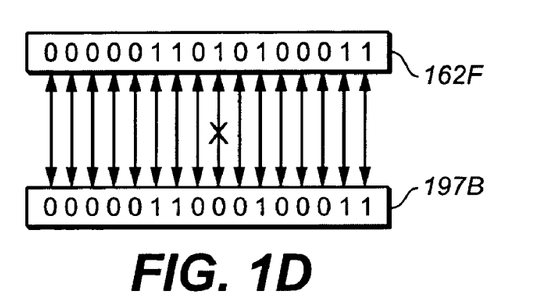
FIG. 1D illustrates comparing an input line against a non-matching TCAM entry line pursuant to a TCAM using compression and hash.

As discussed in more detail in FIGS. 1C and 1D, TCAM controller 167 compares TCAM inputs 197A with TCAM entries 162 derived from retained entries 130 that share a matching hash key with retained input 180. Although FIGS. 1C and 1D present a comparison of a compressed TCAM input and a compressed TCAM entry, the process is similar for comparison of an uncompressed TCAM input and an uncompressed TCAM entry.

FIG. 1B illustrates processing and storing an entry pursuant to a TCAM using compression and hash. The entries are entered, have compression performed on them, are hashed, and then are stored as TCAM entries in the RAM line of TCAM storage corresponding to the matching hash key. The compression process uses compression algorithms and techniques well known in the art.

First, entry 110, comprising entry bits 115, is entered into central processing unit 120. In this example, entry 110 comprises 72 entry bits 115. Central processing unit 120 removes X bits from entry 110 and compresses entry 110 to retained entry 130.

After compression, retained entry 130 comprises a more manageable number N of retained entry bits 135 versus the larger number of bits from entry 110. Compression also generally reduced the number N relative to the non-compressed case in FIG. 1A. In this example, N=16. N can be preset by a user or otherwise predetermined. N can also be selected during operation according to a preset algorithm. After compression, 16 bits of the 72 entry bits 115 comprised in entry 110 are retained as retained entry bits 135 comprised in retained entry 130.

None of the retained entry bits 135 is an X bit. In this example, the 16 retained entry bits 135 are the entry bits 115A-115C, 115I-115K, 115O-115R, 115T, 115V-115X, and 115AA-115BB. Entry bits 115D, 115F, 115H, 115L-115N, 115S, 115U, and 115Y-115Z are X bits so they are omitted from retained entry 130. Entry bits 115E and 115G, while not X bits, are among the entry bits not retained in retained entry 130.

Retained entry 130 next enters into central processing unit 120. Using one or more of a hash table, a set of one or more hashing functions, and direct hashing bits, central processing unit 120 generates a hash key 150 that fits the retained entry bits 135 comprised in retained entry 130. In this example, the 16 retained entry bits 135 are transformed into hash key 150 comprising 10 entry hash key bits 155. Since entry hash key bits 155 are generated from retained entry bits 135, which are not X bits, entry hash key bits 155 are also not X bits.

Central processing unit 120 directs the retained entry 130 matching hash key 150 to TCAM storage 160. Retained entries 130 are saved as TCAM entries 162E, 162F, 162G, 162H ... in one of the RAM lines 165 in TCAM storage 160. Each RAM line 165 matches one hash key 150. In this example, each of the 16 retained entry bits has two possible states (0 or 1) so the number of possible TCAM entries 162 is $2^{16}$. TCAM entry 162E comprises the same bits as retained entry 130. Another TCAM entry 162F fit the same hash key and therefore is stored in the same RAM line 165. TCAM entries 162G and 162H are stored in other RAM lines 165. TCAM controller 167 conducts searches of TCAM storage 160.

Next an input is entered. As in FIG. 1A, retained input bits are determined and the input is hashed, and then stored as a TCAM input in the RAM line of TCAM storage corresponding to the matching hash key.

Input record 170, comprising input bits 175, is entered into central processing unit 120. Input record 170 comprises, in this example, 60 input bits 175. Input record 170 passes through central processing unit 120. Central processing unit 120 selects a set of input bits 185 that corresponds in position to the retained entry bits 135. Central processing unit 120 does not, however, compress input record 170. Thus the number of input bits 185 can equal N, the number of retained entry bits 135. As mentioned above, in this example, N=16. Thus, 16 bits of the 60 input bits 175 in input record 170 are retained as retained input 180 comprising retained input bits 185. The retained input bits 185 each have a corresponding position and a corresponding value. In this schematic example, the 16 retained input bits 185 are input bits 175A-175E, 175G, 175K-175N, 175R-175V, and 175X.

Retained input 180 next enters into central processing unit 120. Using one or more of a hash table, a set of one or more hashing functions, or direct hashing bits, central processing unit 120 generates an input hash key 190 that fits the retained input bits 185 in retained input 180. In this example, input hash key 190 comprises 10 input hash key bits 195 and is the same as entry hash key 150.

Central processing unit 120 directs the retained input 180 matching input hash key 190 to TCAM storage 160. Retained input 180 is saved as TCAM input 197B in a RAM line 165 in TCAM storage 160 that matches input hash key 190. TCAM input 197B comprise the same bits as retained input 180.

As discussed in more detail in FIGS. 1C and 1D, TCAM controller 167 compares retained input 180 with TCAM entries 162 derived from retained entries 130 that share a matching hash key with retained input 180.

FIGS. 1C and 1D present the process whereby the TCAM controller 167 (not pictured) compares TCAM entry 162 from TCAM storage 160 against the TCAM input 197 that occupies the same hash key.

In FIGS. 1C and 1D, for one or more retained inputs 180, a digital comparator (not pictured) coupled to a truth table and comprised in TCAM controller 167 (not pictured) selects the TCAM entries 162 that share the same hash key as the corresponding TCAM input 197. The digital comparator then compares the TCAM entry 162 with the TCAM input 197. That is, the digital comparator then compares retained entry bits 135 of retained entry 130 with the retained input bits 185 of retained input 180 that have a corresponding position. In case of a match between all the compared pairs of bits for input and entry sharing the same hash key, a success is reported. In case of a failure, the failure is reported. According to alternative embodiments, failures need not be reported.

In FIG. 1C, the top line depicts an exemplary TCAM input 197B after an input record goes through the compression and hash processes according to embodiments of the invention. In this particular example, TCAM entry 162E is "0000011000100011." TCAM input 197B is the same as in FIG. 1B." In this example, each bit of TCAM input 197B matches the corresponding bit of TCAM entry 162E. This matching process is therefore a success and will be reported as such. If the corresponding bit of TCAM entry 162E were an X bit, this would also be considered a match. However, normally this would occur because as stated, the X bits are eliminated from the entries in the compression process.

In FIG. 1D, the top line depicts exemplary TCAM input 197B after an input record goes through the compression and hash processes according to embodiments of the invention. Here, TCAM entry 162F is "0000011010100011." TCAM input 197B is again as in FIG. 1B, "0000011000100011.". With one exception, each bit of TCAM input 197B matches the corresponding bit of TCAM entry 162F. In this example, each bit of TCAM entry 197B is either an X bit or matches the corresponding bit of TCAM entry 162F, except for the bit in the ninth position, which does not match. This comparison process is therefore a failure and will be reported as such.

Because the number of different RAM lines 165 for all possible 10-bit hash keys 150 is $2^{10}=1024$, only about one bit in each thousand in the TCAM storage 160 will need to be compared against hashed input 190. For example, a TCAM 160 may be 100 MB in size but only 100 KB of it will need to be compared against hashed input record 190 as only the one or more TCAM entries 162 that match the corresponding RAM line 165 need be compared.

The power of this approach can be seen when it is realized that a brute-force comparison of the retained input against all possible retained entries would require evaluation of a large matrix. One axis of the matrix comprises the different retained entries 130, which in this example are equal in number to $2^{16}=64K$, and the other axis being the 16 different retained input bits in this example, leading to a total number of matrix values of $2^{16}*16=1$ MB. As noted above, the number of different RAM lines 165 is only $2^{10}=1024$, or not much more than a thousandth of the total number of matrix values. Precisely one TCAM entry 162 in one RAM line 165 needs to be compared to retained input 180, resulting in another savings of three orders of magnitude relative to the 1024 different RAM lines. Overall, embodiments of the invention offer a robust, low-heat, large-scale system for searching an input against stored TCAM values.

Figure 2:
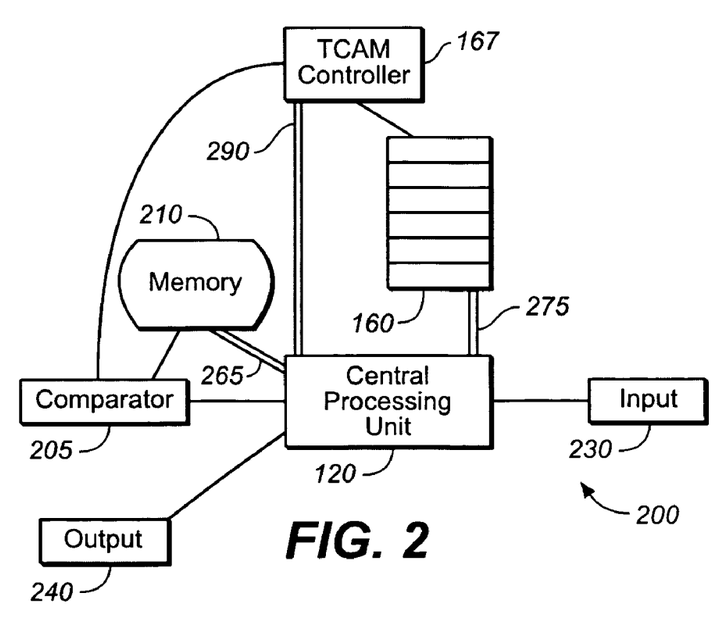
FIG. 2 illustrates a system for comparing an input with a set of entries.

FIG. 2 illustrates a system 200 designed to efficiently compare an input with one or more TCAM entries. The system 200 comprises central processing unit 120, central processing unit 120, TCAM storage 160, TCAM controller 167, digital comparator 205, memory 210, a central processing unit 120, an input 230, and an output 240.

Central processing unit 120 retrieves stored hashed input 190 from memory 210 via memory bus 265. A TCAM bus 275 allows TCAM storage 160 to communicate and exchange data with CPU 120. A TCAM controller bus 290 allows TCAM controller 167 to communicate and exchange data with central processing unit 120.

A digital comparator 205 is coupled to a truth table comprised in memory 210. Digital comparator 205 compares retained entry bits 135 of retained entry 130, which are stored in TCAM storage 160 with retained input bits 185 of retained input 180, which are stored in memory 210. If one or more of the retained input bits 185 does not match the corresponding retained entry bit 135, then a failure has occurred. If they all match, a success has occurred. Failures and successes are reported to TCAM controller 167 and then potentially reported, displayed, or otherwise communicated using output 240. Alternatively, failures need not be reported to TCAM controller 167.

Alternatively, one or more of central processing unit 120, central processing unit 120, TCAM storage 160, TCAM controller 167, digital comparator 199, memory 210, input 230, and output 240 can be located externally to system 200. Alternatively, central processing unit 120 and central processing unit 120 can be the same device in which case the compression operation may be a part of the hash operation or may be a separate operation.

The CPU codes entries into records of variable length. The entries may comprise metadata and compressed data. The compressed data may comprise one or more corresponding sets of triplets. In that case, he compressed data can comprise a long string of triplets of: 1) position of start of current string of retained entry bits; 2) number of retained entry bits in current string of retained entry bits; and 3) retained entry bit data in current string.

The first field of the triplet can provide information on the start position of the current string of retained entry bits. The first field can be either a relative number compared to the previous triplet or an absolute. If the latter, it can comprise a length from the start of the current string of retained entry bits to the start of the next string of retained entry bits. In that case, extra hardware will be needed for fast calculation of absolute position, but some bits will be saved. The limiting factor for the hardware is compressed size, i.e., number of significant or "live" bits and metadata, not uncompressed size or total bits.

FIG. 3 provides a schematic example of generation of a triplet by central processing unit 120 (not pictured). As can be seen in FIG. 3A, an exemplary portion of an entry 110 comprises entry bits 115A, 115B . . . and is illustrated as "000X0X1X001XXX1000X." The first eight bits 115A-115H of the entry 110 are, in the case of FIG. 3A, presumed to have previously been processed into triplets.

Figure 3A:
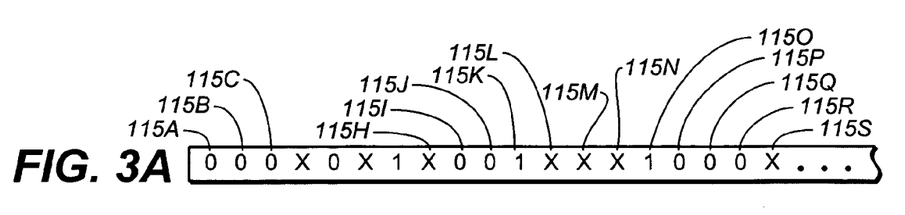
FIG. 3 illustrates generation of a triplet of TCAM fields.
Figure 3B:
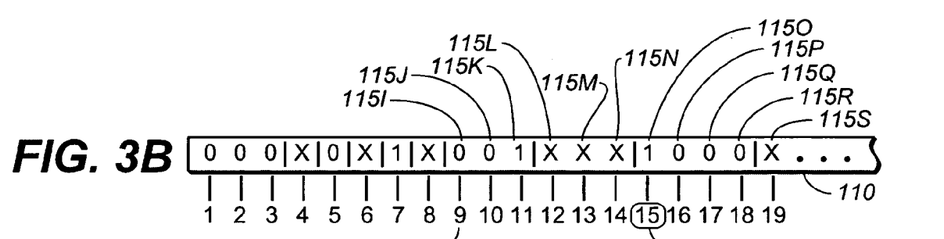

In FIG. 3B, central processing unit 120 (not pictured) inserts breaks between X bits and non-X bits to divide up the significant data that will be transformed into triplets from the X bits that will be ignored. This produces the result "000|X|0|X1|X |001|XXX |1000|X . . . ."

Figure 3C:
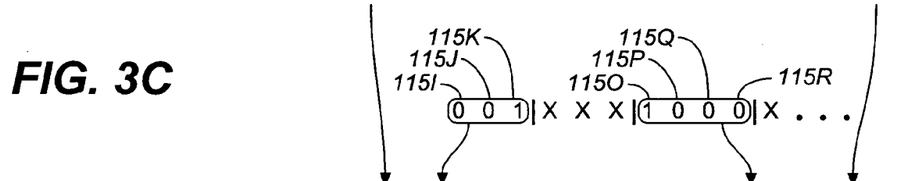

In FIG. 3C, central processing unit 120 (not pictured) processes the start bit of the next triplet, which is the first non-X entry bit that has not yet been processed, entry bit 115I. The triplet is derived based on the set of non-X entry bits beginning with entry bit 115I. In this case, the triplet is derived based on a set comprising three non-X entry bits, entry bits 115I, 115J, and 115K. For simplicity, entry 110 is no longer depicted nor is the portion of the entry 110 that has already been processed depicted.

Figure 3D:
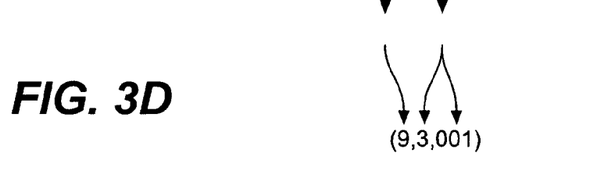

In FIG. 3D, central processing unit 120 (not pictured) calculates the first triplet. Triplets do not include non-X bits. Entry bit 115I, which starts the set of three entry bits, is in the ninth position. The number of non-X bits in the first set of non-X bits starting with the ninth entry bit 115 is 3, and the data is 001. Accordingly, the first triplet generated in this example is (9, 3, 001).

Figure 3E:
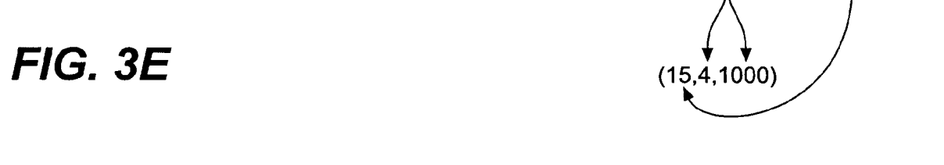

In FIG. 3E, central processing unit 120 (not pictured) calculates the second triplet. Again the process skips over the X bits. Entry bit 115O, which starts the set of four entry bits, is in the fifteenth position. The number of non-X bits in the second set of non-X bits starting with the fifteenth entry bit 115 is 4, and the data is 1000. The start position for the second triplet is, as can be seen from the figure, the next non-X entry bit that has not yet been processed, entry bit 115O. The triplet is derived based on the set of non-X entry bits beginning with entry bit 115O. In this case, the triplet is derived based on a set comprising four non-X entry bits, entry bits 115O, 115P, 115Q, and 115R. The number of non-X bits in the second set of non-X bits is 4, and the data is 1000. Accordingly, the second and final triplet generated in this schematic example is (15, 4, 1000).

If more than one TCAM entry in the appropriate RAM line succeeds when compared to the hashed input, the logic of the TCAM controller will need to decide which one to pick. The choice is made based on priorities. A priority is associated with each record that determines which one is evaluated first. The entries are arranged in order of priority and the highest priority entry can be evaluated first. The priorities tree is static in time; that is, no comparison operation is needed to decide the "winner." Entries may be prioritized in the order of their entry into memory, or in the order of their first bit number. Alternatively, priority can be calculated while the comparison of the input and entries is performed.

If there are many entries in a RAM line, relative priorities can be defined as follows: relative priority [i]=priority[i]−priority[i−1]. Relative priorities can be stored in a compressed form. Relative priorities can be used in place of absolute priorities. They can either be calculated sequentially or by a tree structure. Resources will then be used to compute actual priorities from relative priorities, but the savings in memory may compensate. Alternatively, a relative priority can have two possible values, a maximum relative priority and a typical relative priority.

The maximum relative priority can be a global property of the chip or a property of a specific RAM line. The maximum relative priority can equal the number of bits needed to represent the maximum priority value. For example, maximum priority difference between the ith and jth entry can be log(|i−j|+1). If i=1 and j=16 then four bits will be required to represent that value because log 16=4. Typically the maximum relative priority should be small enough not to require an excessive number of bits but not so small that most relative priorities equal the maximum relative priority. Priorities can be determined using a predetermined priority determination protocol. One possible priority determination protocol is a predetermined order of priority.

For example, suppose predetermined priorities for a set of nine entries are: 6, 100, 102, 2000, 10000, 13456, 22678, 63543, 64000. In base two, the predetermined priorities are then: 110, 1011110, 10, 11101101010, 1111101000000, 110110000000, 10010000000110, 1001111110100001, 111001001. Relative priorities equal to the priority differences between successive entries are: 6, 94, 2, 1898, 8000, 3456, 9222, 40865, 457. The number of bits required to represent these relative priorities is: 3, 7, 2, 11, 13, 12, 14, 16, 9.

For each triplet, a field processor compares the data in the input to the data in the significant (non-X) entry bits and determines success or failure. Success is reported if each significant entry bit matches each corresponding input bit. Operationally, success occurs if the data in each triplet matches the corresponding input data. In that event, a success is reported; otherwise, a failure has occurred and is reported. Alternatively, failures need not be reported. A network of linked AND gates, each connected to a corresponding digital comparator, jointly processes the results of comparing the triplets with corresponding portions of a given input record.

While such a structure can be processed sequentially, a key issue for a real-time TCAM is to break the input into a structure that lets every field processor access the data it needs to process. Two exemplary methods to achieve the same are: 1) Pad fields of a size less than a fixed length whenever necessary. Set a fixed length k for every field and pad the extra bits. 2) Place bits determining triplet length, which can be called "length bits," in predetermined positions. For example, bits in positions 0, k, 2*k, . . . can give the length of a triplet, i.e., the number of retained entry bits in the corresponding string of retained entry bits. The processor will know to "skip" appropriately so as to process the length bits in the positions 0, k, 2*k . . . . In this case, the bits in positions other than 0, k, 2*k . . . will contain the other two pieces of each triplet: position of start of current string of retained entry bits; and retained entry bit data in current string.

Both methods can work depending on hardware and tining requirements. For a small k, method 1 may be better whereas for a large k, method 2 may be preferred. Compression is achieved through both methods. The advantage of a large k is better compression and the drawback is longer processing time. In both methods, every field processor has to process about k bits. But in method 2, if the next triplet happens to start near the end of an entry, the field processor may have to process approximately 2*k bits.

Method 2 is straightforward for the case of a single processor. In chip-level parallel implementation, method 2 may be more difficult to implement because input bits have to be matched to retained entry bits. One means of achieving the same is by rotating the entry data as follows. Once the entry data has been entered, it can be copied into shift registers. For an input size of S, n shift registers will be required, each of approximate size S/n. The first register will contain bit 0, n, 2n, etc. The second shift register will contain bit 1, n+1, 2n+1, etc. Every field processor will see only one bit of every shift register in a processing cycle and the field processor will be able to choose the retained entry bit it needs, if any, by a simple selector. To keep time required reasonable, a limit is placed on the maximum difference in position between the first and last retained entry bit that a field processor processes, that is, on the number of shift registers with which a given field processor must interact.

Figure 4:
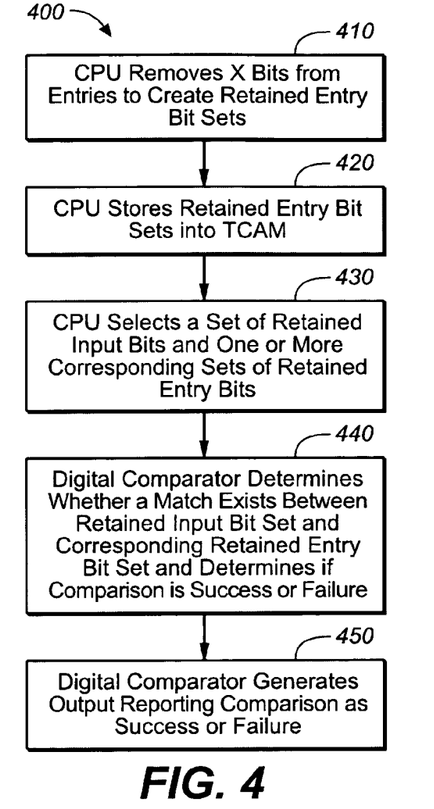
FIG. 4 illustrates a flow chart for a TCAM using compression and hash.

FIG. 4 illustrates a flow chart 400 for a TCAM using compression and hash according to the invention.

In step 410, a central processing unit removes X bits from the set of entries to create one or more retained entry bit sets.

In step 420, the central processing unit stores the retained entry bit sets into the TCAM.

In step 430, the central processing unit selects a set of retained input bits and one or more corresponding sets of retained entry bits.

In step 440, a digital comparator determines whether a match exists between the retained input bit set and the corresponding retained entry bit set. A match indicates success and the absence of a match indicates a failure.

In step 450, the digital comparator generates output reporting the comparison as a success or a failure.

Figure 5:
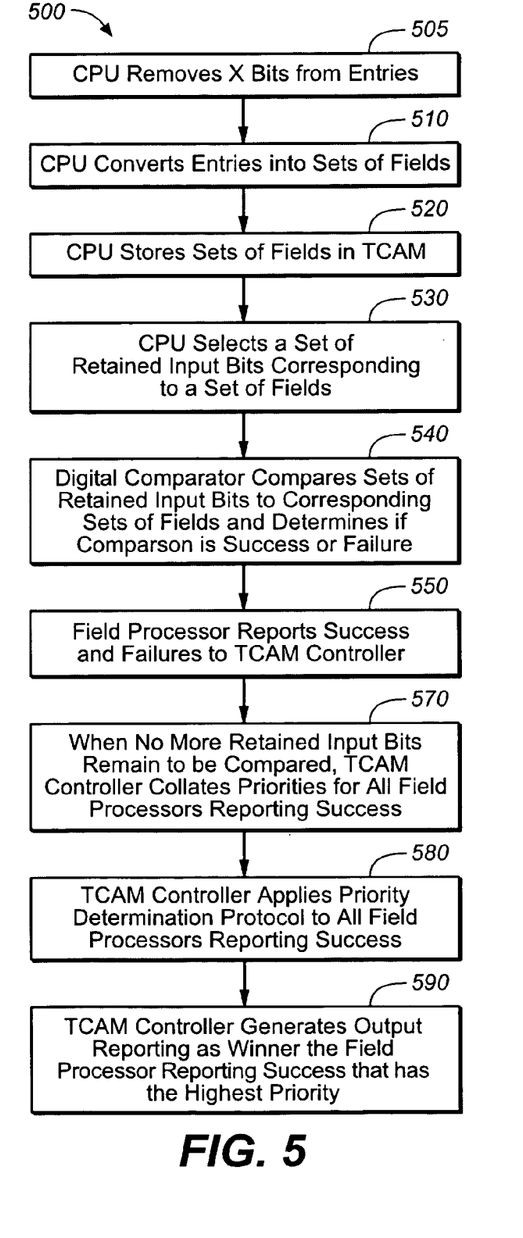
FIG. 5 illustrates a flow chart for a TCAM using compression, hash, and field processors.

FIG. 5 illustrates a flow chart 500 using an ordered series of field processors for efficiently comparing an input with a set of TCAM entries according to the invention, in a high-level view.

In step 510, a central processing unit removes X bits from the set of entries to create one or more retained entry bit sets.

In step 515, a central processing unit converts the retained entry bit sets into sets of fields. In step 520, the central processing unit stores the sets of fields in the TCAM. In step 530, the central processing unit selects from an input sets of retained input bits with positions that correspond to the sets of fields.

In step 540, a digital comparator linked to a corresponding field processor in an ordered series of one or more field processors compares the sets of retained input bits to corresponding sets of fields and determines if a match exists, indicating a success, or if the match does not exist, indicating a failure.

In step 550, the field processor reports the successes and failures to a TCAM controller. In step 570, when no more retained input bits remain to be compared, the TCAM controller collates priorities for all field processors reporting success. In step 580, the TCAM controller applies a predetermined priority determination protocol to all field processors reporting success to determine their priority. In step 590, the TCAM controller generates an output reporting as the winner the field processor reporting success that has the highest priority according to the priority determination method.

Figure 6:
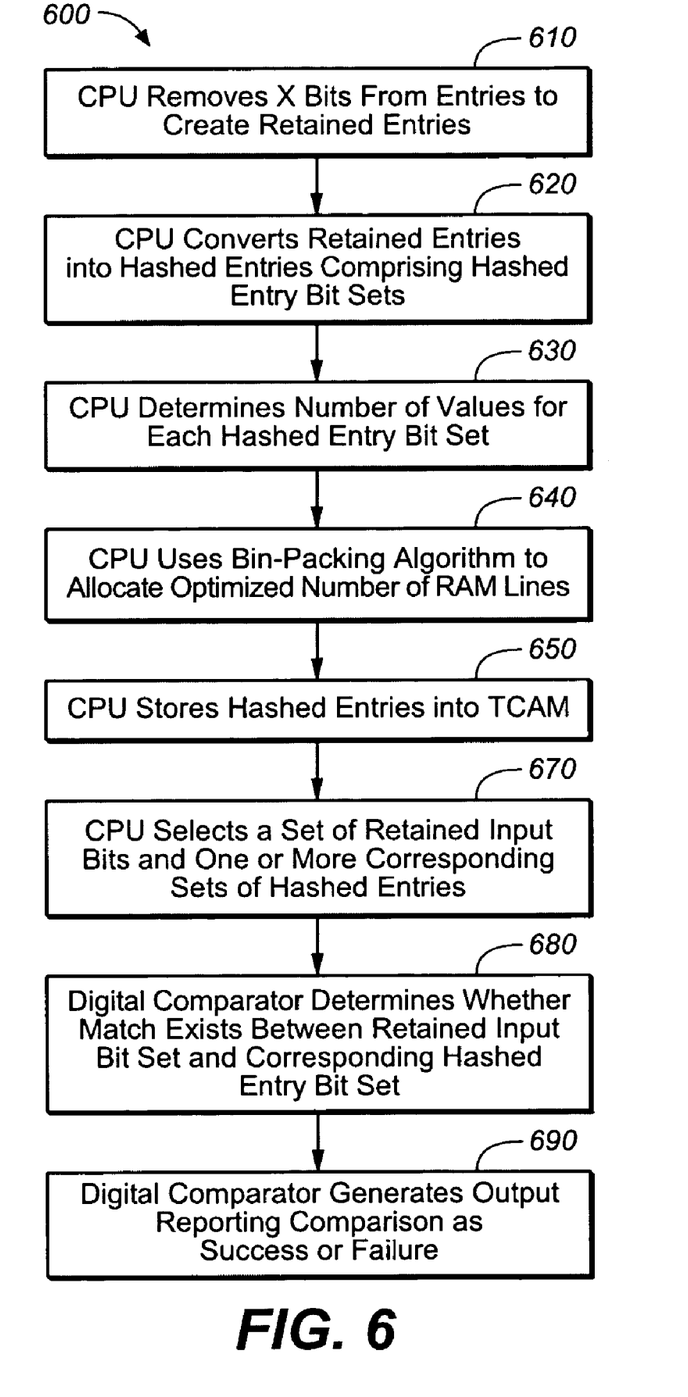
FIG. 6 illustrates a flow chart for a TCAM using compression, hash, and bin-packing.

FIG. 6 illustrates a flow chart 600 for a TCAM using compression, hash, and bin-packing according to the invention.

In step 610, a central processing unit removes X bits from the set of entries to create one or more retained entries.

In step 620, the central processing unit, using hash, converts the retained entries into hashed entries comprising hashed entry bit sets. The CPU is programmed to minimize any remaining X bits, to generate a set of hashed entries with as level a distribution of values as feasible, and to ensure that the largest number of hashed entry bits is less than or equal to the storage limit.

In step 630, the central processing unit determines a number of hashed entry values for each hashed entry bit set. The CPU counts each hashed entry bit that is an X bit as having two possible values. For example, if a hashed entry has three X bits, the CPU will count eight possible values. The result is a table that gives a number of hashed entry values for every possible combination of hash bits.

In step 640, using a bin-packing algorithm, the CPU allocates an optimized number of storage lines to store the one or more hashed entries into the TCAM. Two hash bit values will be mapped to the same RAM line if, and only if, the bin-packing algorithm puts them in the same bin.

In step 650, the CPU stores the hashed entries into the TCAM.

In step 670, the central processing unit selects a set of retained input bits and one or more corresponding sets of hashed entries.

In step 680, a digital comparator determines whether a match exists between the retained input bit set and the corresponding hashed entry bit set. A match indicates success and the absence of a match indicates a failure.

In step 690, the digital comparator generates output reporting the comparison as a success or a failure.

While the present invention has been described with reference to exemplary embodiments, it will be understood by those skilled in the art that various changes may be made and equivalents may be substituted for elements thereof without departing from the true spirit and scope of the present invention. In addition, modifications may be made without departing from the essential teachings of the present invention.

Various alternative systems may be utilized to implement the various methodologies described herein and various methods may be used to achieve certain results from the aforementioned systems.

What is claimed is:

1. A method for generating an output reporting a success or failure in comparing an input with a set of entries in a ternary content-addressable memory (TCAM), the method comprising:
removing don't care (X) bits from the set of entries to create one or more retained entry bit sets;
storing the one or more retained entry bit sets into the TCAM, but not storing the removed X bits in the TCAM;
selecting, in response to instructions executed by a central processing unit, a set of retained input bits and one or more corresponding sets of retained entry bits;
determining, by a digital comparator, whether a match exists between the retained input bit set and the corresponding retained entry bit set, a match indicating success and no match indicating a failure; and
generating, by the digital comparator, output reporting the comparison as success or failure.

2. The method of claim 1, further comprising:
compressing, in response to instructions executed by the central processing unit, the set of entries to create one or more sets of retained entry bits, the retained entry bits not including any X bit, wherein the compressing step is performed before the storing step.

3. The method of claim 2, wherein compressing includes eliminating one or more non-X bits from the set of entries.

4. The method of claim 2, wherein storing the one or more retained entry bits includes:
consulting a table of post-compression sizes of stored retained entry bits; and
terminating storing when the size of the stored retained entry bits equals or is less than a size given in a table of post-compression record sizes.

5. The method of claim 2, wherein compressing the set of entries includes converting the set of entries into sets of fields, the sets of fields including retained entry bits, the sets of fields comprising no X bits.

6. The method of claim 5, wherein the sets of fields are sets of triplets.

7. The method of claim 6, wherein the triplets include: a start field comprising the start position of a corresponding string of retained entry bits, a length field including the number of retained entry bits in the corresponding string of compressed entry bits, and a data field including the retained entry bits in the corresponding string.

8. The method of claim 7, wherein converting includes placing, in response to instructions executed by the central processing unit, one or more of the length fields in predetermined positions; and
configuring, in response to instructions executed by the central processing unit, one or more of the field processors to read one or more corresponding length fields in one or more corresponding predetermined positions.

9. The method of claim 5, wherein converting includes setting, in response to instructions executed by the central processing unit, a fixed length k for every field; and
padding, in response to instructions executed by the central processing unit, the field to extend its length to k for any field of a length less than k.

10. The method of claim 1, wherein storing includes the use of one or more of one or more hash functions, a hash table, or direct hashing bits.

11. The method of claim 1, wherein the sets of retained entry bits are sets of fields.

12. A method for generating an output reporting a success or failure in comparing an input with a set of entries in a TCAM, the method comprising:
removing don't care (X) bits from the set of entries to create one or more retained entry bit sets;
compressing, in response to instructions executed by a central processing unit, the one or more retained entry bit sets to create one or more sets of fields including retained entry bits;
storing the sets of fields into a TCAM, but not storing the removed X bits in the TCAM;
selecting, in response to instructions executed by the central processing unit, sets of retained input bits with positions that correspond to the sets of fields;
comparing, by a digital comparator linked to a field processor in an ordered series of one or more field processors, sets of retained input bits with corresponding set of fields;
determining, by the digital comparator, whether a match exists between one or more sets of retained input bits and the corresponding sets of fields, the existence of a match indicating a success and the lack of a match indicating a failure;
reporting the successes and failures to a TCAM controller by the one or more field processors;
collating, by the TCAM controller, all field processors reporting success when no more retained input bits remain to be compared;
applying, by the TCAM controller, a predetermined priority determination protocol to all field processors reporting success to determine a priority for the successful field processors; and
generating, by the TCAM controller, an output reporting as the winner the success-reporting field processor that has the highest priority according to the priority determination method.

13. The method of claim 12, further comprising:
determining, in response to instructions executed by the central processing unit, using a predetermined priority determination protocol, priorities for the successful field processors;
finding, in response to instructions executed by the central processing unit, a successful field processor that has the highest priority of the successful field processors; and
reporting, in response to instructions executed by the central processing unit, the highest-priority successful field processor to be the winner, wherein the determination, finding, and reporting steps are performed after the comparing step.

14. The method of claim 13, further comprising the further step of compressing, in response to instructions executed by the central processing unit, one or more of the determined priorities, wherein compressing occurs subsequent to the determination step.

15. The method of claim 12, wherein the determining step comprises the sub-step of:
inputting, by the central processing unit, preestablished priority values for one or more field processors.

16. The method of claim 12, wherein compressing includes calculating, in response to instructions executed by the central processing unit, priority differences between priority values for successive pairs of field processors.

17. The method of claim 16, wherein compressing includes computing a size in bits for one or more of the priority differences, wherein computing occurs subsequent to the calculating step.

18. The method of claim 17, wherein compressing includes setting, in response to instructions executed by the central processing unit, the priority difference to equal a maximum relative priority when the size in bits is equal to or greater than the maximum relative priority, or setting the priority difference to equal a typical relative priority, wherein the typical relative priority is less than the maximum relative priority, the compressing step occurring subsequent to the computing step.

19. The method of claim 18, wherein the maximum relative priority equals the size in bits of the highest priority value.

20. The method of claim 12, wherein the step of storing includes copying, in response to instructions executed by the central processing unit, the retained entry bits into m shift registers, each of a size of approximately S/m, where S approximately equals the total bits comprised in the one or more sets of stored retained entry bits.

21. A method for generating an output reporting a success or failure in comparing an input with a set of entries in a TCAM, the method comprising:
removing don't care (X) bits from the set of entries to create one or more retained entry bit sets;
compressing, in response to instructions executed by a central processing unit, the one or more retained entry bit sets to create one or more sets of triplets;
storing the sets of triplets into a TCAM, but not storing the removed X bits in the TCAM;
selecting, in response to instructions executed by the central processing unit, sets of retained input bits with positions that correspond to the sets of triplets;
comparing, by a digital comparator linked to a field processor in an ordered series of one or more field processors, sets of retained input bits with corresponding sets of triplets;
determining, by the digital comparator, whether a match exists between one or more sets of retained input bits and the corresponding sets of triplets, the existence of a match indicating a success and the lack of a match indicating a failure;

reporting the successes and failures to a TCAM controller by the one or more field processors;

collating, by the TCAM controller, all field processors reporting success when no more retained input bits remain to be compared;

determining, by the TCAM controller, using the predetermined priority determination protocol, priorities for the successful field processors;

compressing, by the TCAM controller, one or more of the determined priorities;

finding, by the TCAM controller, a successful field processor that has the highest priority of the successful field processors; and generating, by the TCAM controller, an output reporting the highest-priority successful field processor to be the winner.

22. A method for generating an output reporting a success or failure in comparing an input with a set of entries in a ternary content-addressable memory (TCAM) comprising storage lines having a storage limit, the method comprising:

removing don't care (X) bits from the set of entries to create one or more retained entries;

using hash, converting the retained entries into hashed entries comprising hashed entry bit sets, so that the largest number of hashed entry bits is less than or equal to the storage limit;

determining a number of hashed entry values for each hashed entry bit set;

using a bin-packing algorithm, allocating an optimized number of storage lines to store the one or more hashed entries into the TCAM;

storing the one or more hashed entries into the TCAM, but not storing the removed X bits in the TCAM;

selecting, in response to instructions executed by a central processing unit, a set of retained input bits and one or more corresponding sets of hashed entry bits;

determining, by a digital comparator, whether a match exists between the retained input bit set and the corresponding hashed entry bit set, a match indicating success and no match indicating a failure; and generating, by the digital comparator, output reporting the comparison as success or failure.

23. A non-transitory computer-readable storage medium having embodied thereon a program, the program being executable by a computer to perform a method for efficiently comparing an input with a set of entries in a TCAM, the method comprising:

removing don't care (X) bits from the set of entries to create one or more retained entry bit sets;

storing the one or more retained entry bit sets into the TCAM, but not storing the removed X bits in the TCAM;

selecting a set of retained input bits and one or more corresponding sets of retained entry bits;

determining whether a match exists between the retained input bit set and the corresponding retained entry bit set, a match indicating success and a lack of a match indicating failure; and generating output reporting the comparison as success or failure.

* * * * *